(12) United States Patent
Holm

(10) Patent No.: US 11,572,936 B2
(45) Date of Patent: Feb. 7, 2023

(54) BALL RETURN TUBE FOR BALL NUT ASSEMBLY

(71) Applicant: HL MANDO CORPORATION, Gyeonggi-do (KR)

(72) Inventor: John Holm, Superior Township, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/785,520

(22) Filed: Feb. 7, 2020

(65) Prior Publication Data

US 2020/0278012 A1    Sep. 3, 2020

Related U.S. Application Data

(60) Provisional application No. 62/812,136, filed on Feb. 28, 2019.

(51) Int. Cl.
| | | |
|---|---|---|
| *F16H 25/20* | (2006.01) | |
| *F16H 25/22* | (2006.01) | |
| *B62D 5/04* | (2006.01) | |
| *B62D 3/12* | (2006.01) | |

(52) U.S. Cl.
CPC .......... *F16H 25/2214* (2013.01); *B62D 3/12* (2013.01); *B62D 5/0448* (2013.01)

(58) Field of Classification Search
CPC ...... F16H 25/2214; B62D 3/12; B62D 5/0448
See application file for complete search history.

(56) References Cited

U.S. PATENT DOCUMENTS

| | | | |
|---|---|---|---|
| 3,161,073 A | 12/1964 | Deutsch et al. | |
| 6,176,149 B1 | 6/2001 | Misu | |
| 7,461,572 B2* | 12/2008 | Iida | F16H 25/2214 74/424.87 |
| 10,113,620 B2* | 10/2018 | Hsieh | F16H 25/2223 |

(Continued)

FOREIGN PATENT DOCUMENTS

| | | |
|---|---|---|
| JP | 2004-100816 | 4/2004 |
| WO | 2016/090088 A1 | 6/2016 |

OTHER PUBLICATIONS

International Search Report from PCT/KR2020/002641 dated Jun. 26, 2020.

(Continued)

*Primary Examiner* — Zakaria Elahmadi
(74) *Attorney, Agent, or Firm* — Ladas & Parry, LLP

(57) ABSTRACT

A ball return tube for connecting openings of a ball nut to circulate balls comprises tube end portions for being coupled to the openings of the ball nut, and a tube body connecting the tube end portions so that the balls can pass through the tube body. The ball return tube is constructed in first and second tube portions fixedly joined together by structures included in a first projection protruding from a first surface of the tube body. The ball return tube further comprises one or more of a second projection protruding from a second surface of the tube body in a direction toward the ball nut, a third projection protruding from a lateral side surface of the tube body, and a fourth projection protruding from the tube open end portions so that the projections can be coupled to corresponding recesses of the ball nut.

19 Claims, 11 Drawing Sheets

(56) References Cited

U.S. PATENT DOCUMENTS

| | | | |
|---|---|---|---|
| 2003/0062719 A1* | 4/2003 | Chiu | F16H 25/2214 |
| | | | 285/134.1 |
| 2010/0242653 A1* | 9/2010 | Adler | F16H 25/2214 |
| | | | 74/424.87 |
| 2011/0146436 A1 | 6/2011 | Brown | |
| 2017/0361866 A1* | 12/2017 | Bari | F16H 25/2214 |
| 2018/0363746 A1* | 12/2018 | Yamamoto | F16H 25/22 |

OTHER PUBLICATIONS

Written Opinion of the International Searching Authority from PCT/KR2020/002641 dated Jun. 26, 2020.

* cited by examiner

BALL RETURN TUBE FOR BALL NUT ASSEMBLY

CROSS REFERENCE TO RELATED APPLICATION(S)

This application claims the benefit of U.S. patent application Ser. No. 62/812,136 filed on Feb. 28, 2019, entitled "RBNA RETURN TUBE", which is all hereby incorporated herein by reference in its entirety.

BACKGROUND

Various embodiments of the present disclosure relate in general to the field of ball nut and screw assemblies, and more particularly, to a ball return tube connected to a ball nut for repeatedly circulating balls.

Ball nut and screw assemblies are widely used in industry for translating linear motion into rotary motion or vice versa. Thus, they are employed in actuators in various applications including machine tools, aircraft controls, and so on. Another major field of use in the steering of automotive vehicles. The ball nut and screw assemblies typically include a ball return tube for returning balls from one end to another end of a ball nut. Commonly, the ball return tube is secured by a clip screwed or attached to the ball nut, which may increase complexity and cost of assembling the ball nut and screw assembly.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various exemplary embodiments of the present disclosure, a ball return tube for connecting openings of a ball nut to circulate balls may comprise tube end portions for being coupled to the openings of the ball nut, and a ball return tube body connecting the tube end portions so that the balls can pass through the ball return tube body.

The ball return tube may be constructed in first and second tube portions fixedly joined together by structures included in one or more first projections protruding from a first surface of the ball return tube body. The structures included in the one or more first projections protruding from the first surface of the ball return tube body may comprise snap fits configured to engage one another to fixedly couple the first and second tube portions together. The one or more first projections of the first tube portion may comprise a male snap extending from a surface of the one or more first projections of the first tube portion, and the one or more first projections of the second tube portion may comprise a female snap receiving the male snap of the first tube portion. For example, one of the one or more first projections of the first tube portion comprises a male snap, and another of the one or more first projections of the first tube portion comprises a female snap; and one of the one or more first projections of the second tube portion comprises a female snap corresponding to the male snap of the one of the one or more first projections of the first tube portion, and another of the one or more first projections of the second tube portion comprises a male snap corresponding to the female snap of the another of the one or more first projections of the first tube portion. A distal end of the one or more first projections protruding from the first surface of the ball return tube body may be spaced apart from an inner surface of a ball nut housing or enclosure accommodating the ball nut. One or more of the first projections may extend from the first surface of the ball return tube body in a direction away from the ball nut. Alternatively, one or more of the first projections may extend from the first surface of the ball return tube body in a direction away from one or both of the tube end portions.

Alternatively or additionally, the ball return tube may comprise one or more second projections protruding from a second surface of the ball return tube body in a direction toward the ball nut so that the one or more second projections of the ball return tube body can be coupled to one or more corresponding recesses of the ball nut. The second surface of the ball return tube body from which the one or more second projections protrude may face the ball nut. The one or more second projections protruding from the second surface of the ball return tube body in the direction toward the ball nut may include an enlarged portion having a greater width or diameter than a remainder of the one or more second projections. A head portion of the one or more second projections protruding from the second surface of the ball return tube body in the direction toward the ball nut have a greater width or diameter than a stem portion of the one or more second projections protruding from the another surface of the ball return tube body in the direction toward the ball nut. For example, the one or more second projections protruding from the second surface of the ball return tube body in the direction toward the ball nut has a pin shape to be coupled to one or more corresponding recesses of the ball nut. The one or more second projections protruding from the second surface of the ball return tube body in the direction toward the ball nut comprises a tab shape to be coupled to one or more corresponding recesses of the ball nut. The one or more second projections protruding from the second surface of the ball return tube body in the direction toward the ball nut have a projecting edge protruding in a direction substantially perpendicular to the direction toward the ball nut.

Alternatively or additionally, the ball return tube may comprise one or more third projections protruding from a lateral side surface of the ball return tube body to be coupled to one or more corresponding recesses formed in the ball nut. The lateral side surface of the tube body, from which the one or more third projections protrude, may contact the ball nut. The one or more third projections protruding from the lateral side surface of the ball return tube body may protrude substantially perpendicular to a direction toward the ball nut.

Alternatively or additionally, the ball return tube may comprise one or more fourth projections protruding from at least one of surfaces of the tube open end portions to be coupled to one or more corresponding recesses formed on an inner surface of the openings of the ball nut. The one or more fourth projections protruding from the at least one of surfaces of the tube open end portions may have a ring shape.

The ball return tube may comprise one or combination of the first to fourth protrusions.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
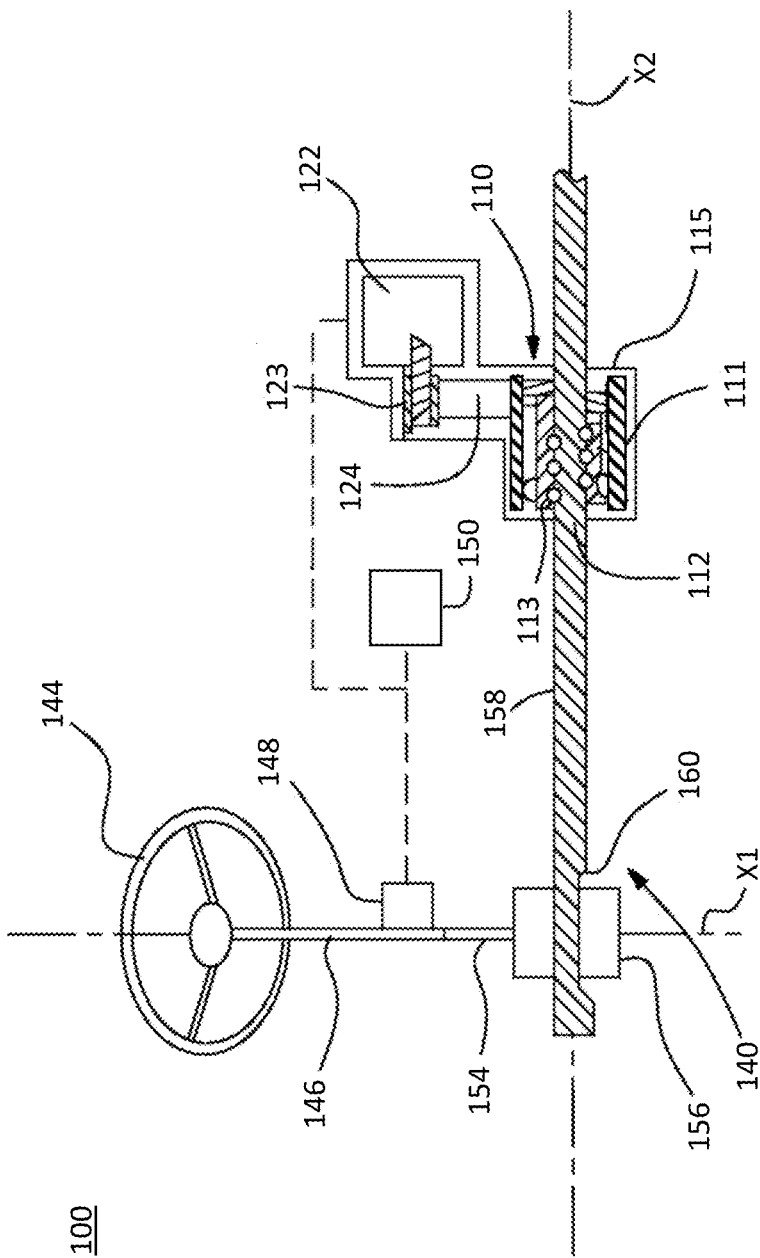
FIG. 1 is a schematic diagram of a steering system of a vehicle according to an exemplary embodiment of the present disclosure.

Referring now to FIG. 1, an exemplary embodiment of a steering system 100 is disclosed. The steering system 100 comprises a ball nut assembly, indicated generally at 110. The ball nut assembly 110 may be for use with a vehicle steering gear, indicated generally at 140.

The vehicle steering gear 140 may be, for example, but not limited to, an electric power steering (EPS) assembly comprising a vehicle electric belt driven rack drive steering assembly and may be associated with the front steer wheels of the vehicle. Also, although the ball nut assembly 110 will be described and illustrated in connection with the particular vehicle steering gear 140 disclosed herein, it will be appreciated that the ball nut assembly 110 may be used in connection with other vehicle power steering assemblies, including other electric, hydraulic, or otherwise powered power steering assemblies known to those skilled in the art.

The vehicle steering gear 140 may include a vehicle steering wheel 144 and a rotatable input shaft 146 which is operatively coupled to the steering wheel 144 for rotation therewith about a steering axis X1. A torque sensor 148 encircles the input shaft 146. The torque sensor 148 responds to rotation of the input shaft 146 and detects a direction and magnitude of applied steering torque. The direction and magnitude of applied steering torque are communicated, via a data network, to an electronic control unit (ECU) 150.

A torsion bar 154 is provided to connect the input shaft 146 to a pinion 156. The torsion bar 154 twists in response to the steering torque applied to the steering wheel 144. When the torsion bar 154 twists, relative rotation occurs between the input shaft 146 and the pinion 156.

A linearly movable steering member 158 is linearly (or axially) movable along a rack axis (or a ball nut axis) X2. A rack portion 160 is provided with a series of rack teeth which engage gear teeth provided on the pinion 156. The steering member 158 further includes a ball screw portion 111 having an external screw thread. The steering member 158 is connected with steerable wheels of the vehicle through tie rods located at the distal ends of the steering member 158. Linear movement of the steering member 158 along the rack axis X2 results in steering movement of the steerable wheels.

The steering gear 140 further includes a power source 122, illustrated as an electric motor, which is drivably connected to the ball nut assembly 110. Alternatively, the power source 122 may be other than the electric motor. For example, the power source 122 may be a hydraulic system. The power source 122 is actuated by the electronic control unit 150.

The ball nut assembly 110 effects axial movement of the steering member 158 upon rotation of the steering wheel 144. In the event of the inability of the power source 122 to effect axial movement of the steering member 158, the mechanical connection between the gear teeth on the pinion 156 and the rack teeth on the rack portion 160 of the steering member 158 permits manual steering of the vehicle. The ball nut assembly 110 encircles the ball screw portion 112 of the steering member 158.

The ball nut assembly 110 includes a ball nut 111 and a plurality of force-transmitting members. The ball nut 111 may be disposed in a ball nut housing or enclosure 115. The ball nut housing or enclosure 115 may be implemented as a driven pulley, and the ball nut 111 may be rotationally fixed to the driven pulley 115. The force transmitting members comprise balls 113, which are disposed between the ball nut 111 and the ball screw portion 112. The ball nut 111 is supported by the balls 113 on the steering member 118. The balls 113 are loaded into the ball nut assembly 110.

The power source 122 rotationally drives a drive pulley 123 which is connected to a member 124 for rotation therewith. For example, the member 124 may be a timing belt. The timing belt 124 is operatively connected to the driven pulley 115. Thus, when the power source 122 is actuated, the timing belt 124 is rotated via the drive pulley 123 so as to rotate the driven pulley 115. The rotation of the driven pulley 115 causes the ball nut 111 to be rotated and thereby produce axial movement of the ball screw portion 112 of the steering member 158 via the balls 113.

Figure 2:
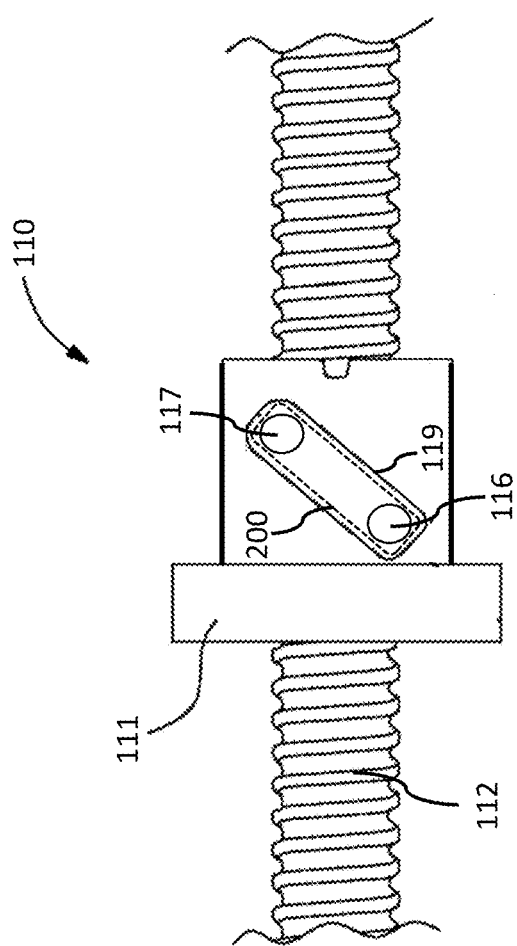
FIG. 2 is a partial view of a ball nut assembly according to an exemplary embodiment of the present disclosure.
Figure 3:
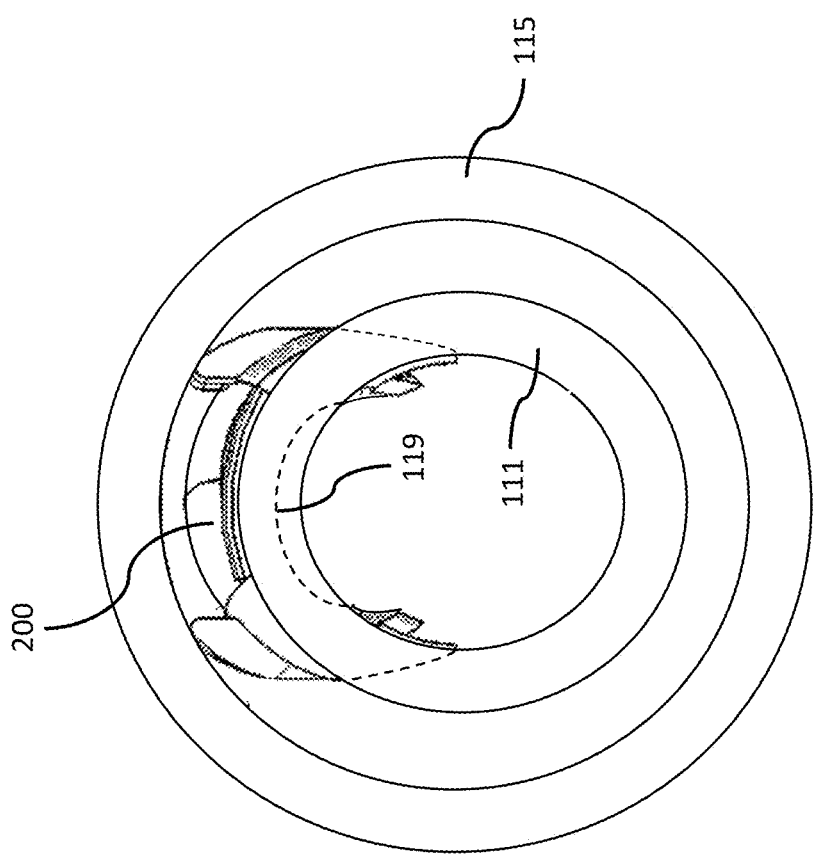
FIG. 3 is a side view of an assembly of a ball nut, a ball return tube and a ball nut housing/enclosure (or a pulley) according to an exemplary embodiment of the present disclosure.
Figure 4:
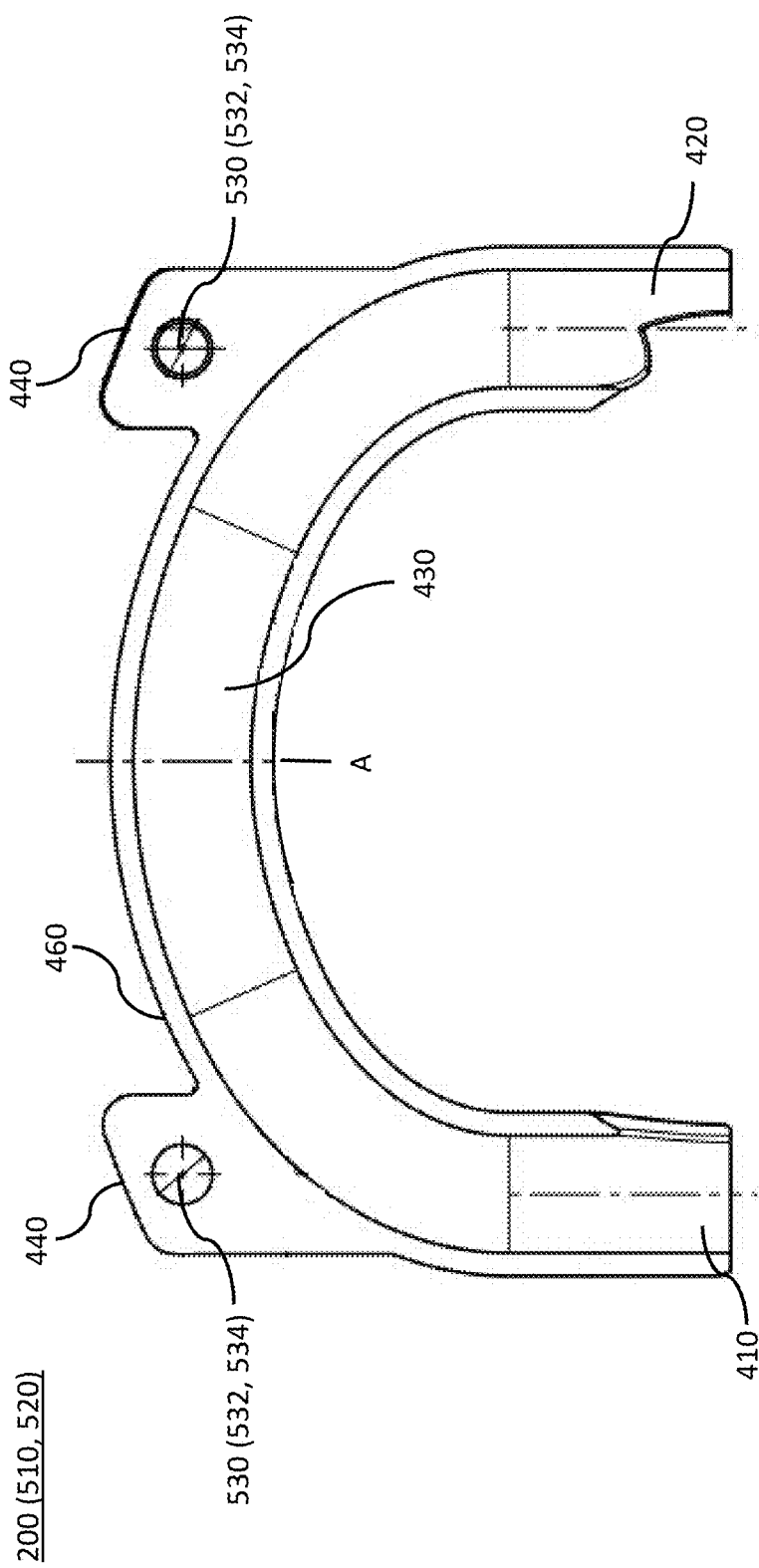
FIG. 4 is a rear view of one of tube portions of a ball return tube according to an exemplary embodiment of the present disclosure.

Referring now to FIG. 2, the ball nut assembly 110 includes the ball nut 111, the ball screw portion 112, and a ball return tube 200.

The ball return tube 200 is secured to the ball nut 111. For example, end portions of the ball return tube 200 is fixedly inserted to first and second openings 116 and 117 of the ball nut 111. The ball return tube 200 connects first and second openings 116 and 117 of the ball nut 111 to circulate the balls 113. The balls 113 repeatedly circulate between the ball nut 111 and the ball screw portion 112, through the first opening 116 of the ball nut 111, through the ball return tube 200, and through the second opening 117 of the ball nut 111, and back between the ball nut 111 and the ball screw portion 112. The balls 113 may also circulate through the ball return tube 200 from the first opening 116 to the second opening 117 (or from the second opening 117 to the first opening 116).

A ball return tube path 119 may be formed on an outer circumferential surface of the ball nut 111. The ball return tube path 119 may be implemented as a recess or groove. The ball return tube path 119 may be shaped and dimensioned so that at least part of the ball return tube 200 (for example, a bottom surface of the ball return tube 200) can be seat on or received in the ball return tube path 119.

Referring now to FIGS. 4 to 8, various exemplary embodiments of the ball return tube 200 are illustrated in detail.

The ball return tube 200 may include a first open end portion 410, a second open end portion 420, and a tube body 430. The first and second open end portions 410 and 420 of the ball return tube 200 may be fixedly coupled to the first and second openings 116 and 117 of the ball nut 111 of FIG. 2, respectively. The tube body 430 connects between the first and second open end portions 410 and 420 of the ball return tube 200 so that the balls 113 can pass through the inside of the tube body 430 from the first open end portion 410 to the second open end portion 420 or vice versa.

The ball return tube 200 can be constructed in two or more tube portions joined together in any manner, such as by rivets, stakes or crimps (whether using the parent material of the tube portions or not), welds, screws, bolts, snap-fit connections, adhesive or cohesive bonding material, bands, clips, pin and aperture connections, and the like. In some exemplary embodiments of the present disclosure, the ball return tube 200 is formed from first and second tube portion 510 and 520, respectively.

The ball return tube 200 may have one or more first projections 440 protruding from a first surface 460 of the tube body 430 in a direction away from the ball nut 111. The first projections 440 may extend toward the pulley or ball nut housing/enclosure 115. The first surface 460 of the tube body 430 may be a surface of the tube body 430 facing the pulley or ball nut housing/enclosure 115, for example, but not limited to, the top surface of the tube body 430. For instance, the first projections 440 protrudes from the top surface of the tube body 430 in a radial direction of the ball nut 111. The first projections 440 have structures or arrangement 530 fixedly coupling the first and second tube portions 510 and 520 together in any manner, such as by rivets, stakes or crimps, welds, screws, bolts, snap-fit connections, adhesive or cohesive bonding material, bands, clips, pin and aperture connections, and the like. The first and second tube portions 510 and 520 of the ball return tube 200 are held together by the structures 530 formed at the first projections 440. For example, each of the first projections 440 includes a snap fit 530. The snap fit 530 have a male snap (or projection) 532 extending from the first tube portion 510 and a female snap (or recess) 534 in the second tube portion 520. Alternatively, the male snap (or projection) 532 may extend from the second tube portion 520 and the female snap (or recess) 534 may be in the first tube portion 510. In the exemplary embodiment shown in FIG. 4, the first tube portion 510 has two first projections 440, one having the male snap (or projection) 532 and the other having the female snap (or recess) 534. Likewise, the second tube portion 520 also has two corresponding first projections 440, one having the female snap (or recess) 534 corresponding to the male snap (or projection 532) of the first tube portion 510 and the other having the male snap (or projection) 532 corresponding to the female snap (or recess) 530 of the first tube portion 510. Accordingly, the first tube portion 510 and the second tube portion 520 may have the same shape as each other, and therefore they are interchangeable with each other and the manufacturing cost of the ball return tube 200 may be reduced. In another exemplary embodiment, the first tube portion 510 may have first projections 440 all having the male snaps (or projections) 532, and the second tube portion 520 may have corresponding first projections 440 all having the female snaps (or recesses) 534. Alternatively, the first tube portion 510 may have first projections 440 all having the female snaps (or recesses) 534 and the second tube portion 520 may have first projections 440 all having the male snaps (or projections) 532.

Figure 5:
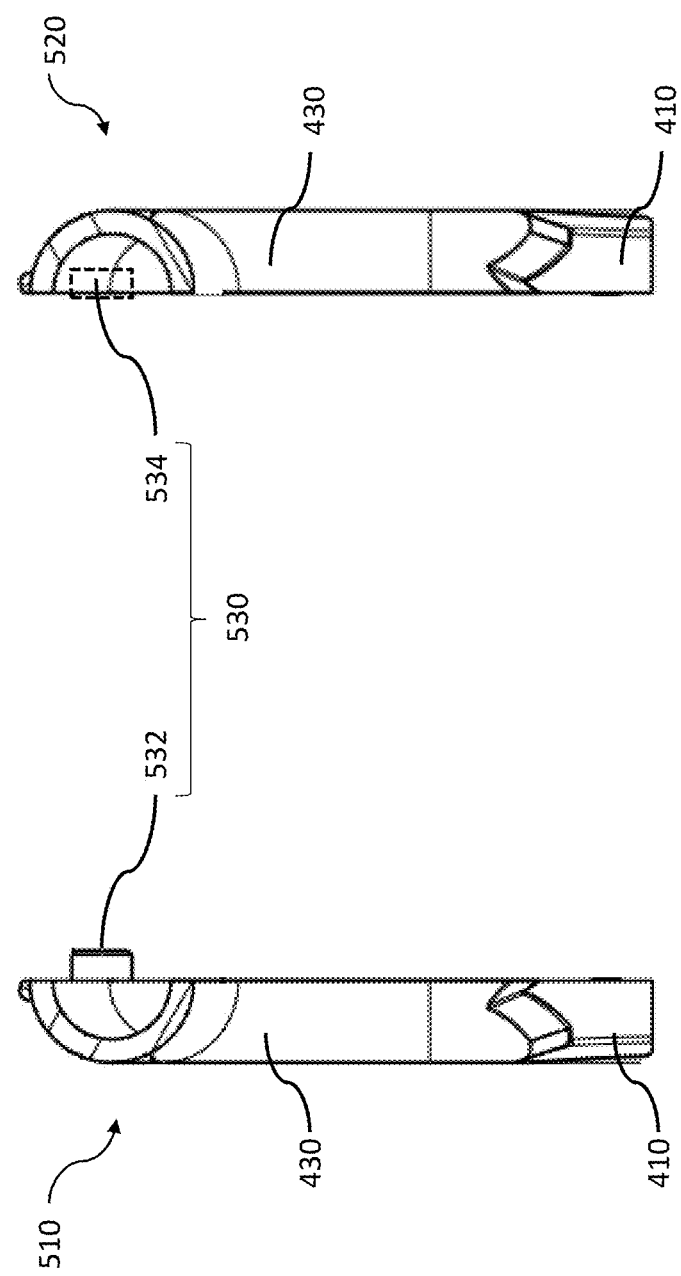
FIG. 5 is an exploded and cross-sectional view taken along a line A of FIG. 4 according to an exemplary embodiment of the present disclosure.

Although FIG. 5 shows the coupling structure or arrangement 530 as a snap fit for illustration purposes, any coupling arrangement can be used as the coupling structure or arrangement 530, for example, but not limited to, rivets, stakes or crimps, welds, screws, bolts, adhesive or cohesive bonding material, bands, clips, pin and aperture connections and the like. The first projections 440 of the ball return tube 200 may maintain and secure the first and second tube portions 510 and 520 in proper alignment for assembly.

While two first projections 440 are shown, it is contemplated that a single first projection 440 may be provided or more than two may be provided.

The first projections 440 protruding from the top surface of the tube body 430 may be spaced apart from an inner surface of the pulley or ball nut housing/enclosure 115 accommodating the ball nut 111. For example, the clearance between the distal end of the first projection 440 and the inner surface of the pulley or ball nut housing/enclosure 115 may be less than 1 mm, preferably 0.5 mm. The ball nut tube 200 cannot disengage from the ball nut 111 once the pulley or ball nut housing/enclosure 115 is attached.

Figure 6B:
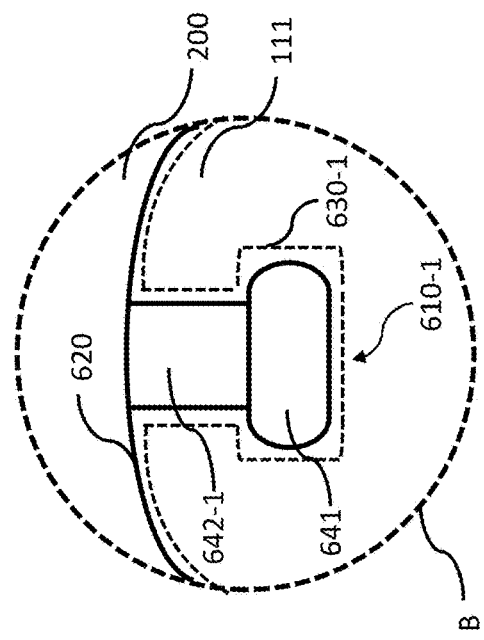
FIG. 6B is an enlarged view of a portion B of FIG. 6A coupled with a ball nut according to exemplary embodiments of the present disclosure.
Figure 6A:
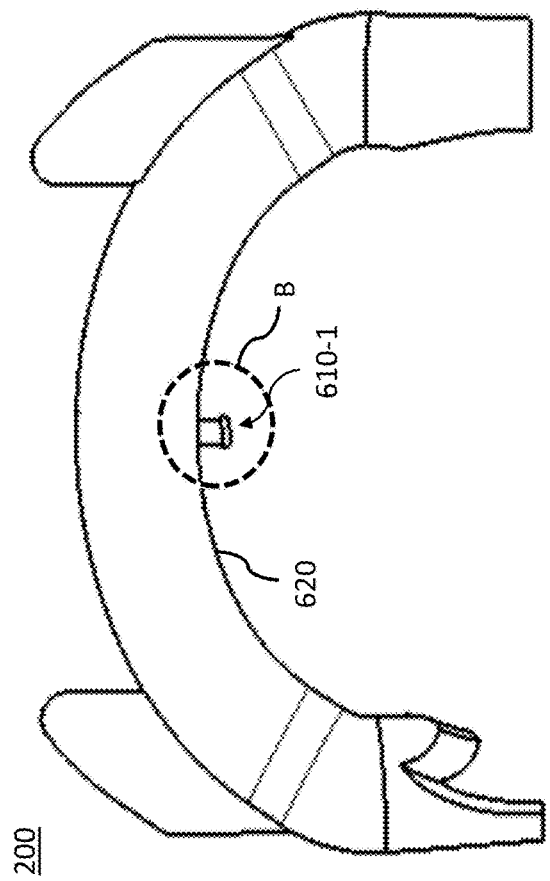
FIGS. 6A and 6C are front and rear views of one of tube portions of a ball return tube according to exemplary embodiments of the present disclosure.
Figure 6D:
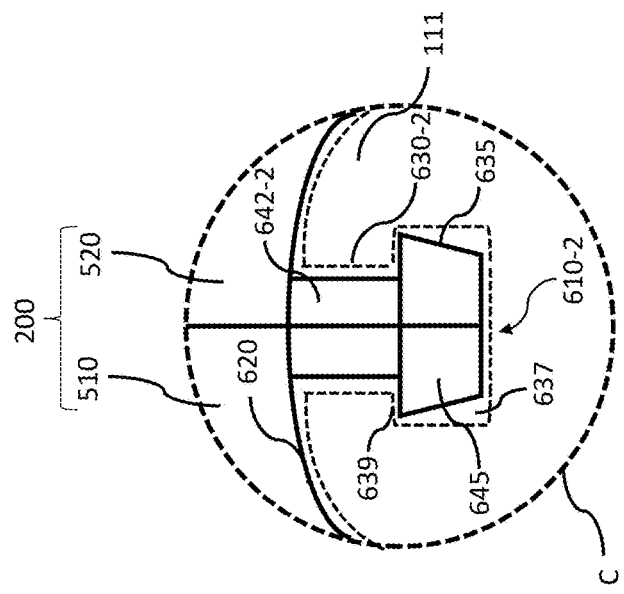
FIG. 6D is an enlarged partial and cross-section view taken along a line C of FIG. 6C coupled with a ball nut according to exemplary embodiments of the present disclosure.

Referring now to FIGS. 6A to 6E, the ball return tube 200 may comprise one or more second projections 610 (e.g. 610-1 of FIGS. 6A and 6B and 610-2 of FIGS. 6C to 6E) protruding from a second surface 620 in a direction toward the ball nut 111. The second surface 620 of the ball return tube 200 may be a surface of the ball return tube 200 facing the ball nut 111, for example, but not limited to, the bottom surface of the ball return tube 200. The second projection 610 of the ball return tube 200 can be engaged with a recess, notch, groove, an aperture or the like 630 (e.g. 630-1 of FIG. 6B and 630-2 of FIG. 6D) formed in the ball return tube path 119 which is formed in an outer circumferential surface of the ball nut 111 (See FIG. 2). In FIGS. 6B and 6D, the structures of the ball nut 111 are illustrated with dotted lines. The number of recesses 630 of the ball nut 111 may correspond to the number of the second projections 610 of the ball return tube 200. The recess 630 may have any shape desired, dependent at least partially upon the shape and position of the second projection 610. Optionally, the second projection 610 of the ball return tube 200 may have an enlarged portion in the distal end or middle of the second projection 610.

In a first exemplary embodiment of the second projection of the ball return tube 200 shown in FIGS. 6A and 6B, the second projection 610-1 of the ball return tube 200 may have a generally cylindrical shape such as a pin or rod. The second projection 610-1 may have a radially enlarged portion 641 which projects radially outward from a circumferential surface of the second projection 610-1 and extend over at least a portion of the circumference of the second projection 610-1. The enlarged portion 641 of the second projection 610-1 may have a shape of, for example, but not limited to, a sphere, a cylinder, a flange, a tapered or angled cone, and the like.

For instance, the second projection 610-1 includes a relatively straight and cylindrical stem portion 642-1 extending downwardly towards the ball nut 111, and the enlarged protrusion 641 of the second projection 610-1 may be formed at the distal end of the second projection 610-1. Therefore, the diameter of the head portion 641 of the second projection 610-1 may be greater than the diameter of the stem portion 642-1 of the second projection 610-1. Alternatively or additionally, the radially enlarged protrusion 641 may be disposed in the middle of the second projection 610-1. The enlarged protrusion 641 of the second projection 610-1 may reduce the risk of the ball return tube 200 falling or separating from the ball nut 111.

The ball nut 111 has the recess 630-1 for receiving the second projection 610-1 of the ball return tube 200. The recess 630-1 of the ball nut 111 is sized and dimensioned to receive the second projection 610-1 of the ball return tube 200 so that the second projection 610-1 of the ball return tube 200 can be inserted and securely fixed to the recess 630-1 of the ball nut 111. The recess 630-1 of the ball nut 111 may have a shape configured to generally conform to the shape of the second projection 610-1 and mate with the second projection 610-1. The second projection 610-1 of the ball return tube 200 may fit in the recess 630-1 of the ball nut 111. For example, the shape of the recess 630-1 of the ball nut 111 mirrors the shape of the second projection 610-1 of the ball return tube 200. The recess 630-1 of the ball nut 111 may have a depth substantially identical to a length of the second projection 610-1 of the ball return tube 200.

Figure 6C:
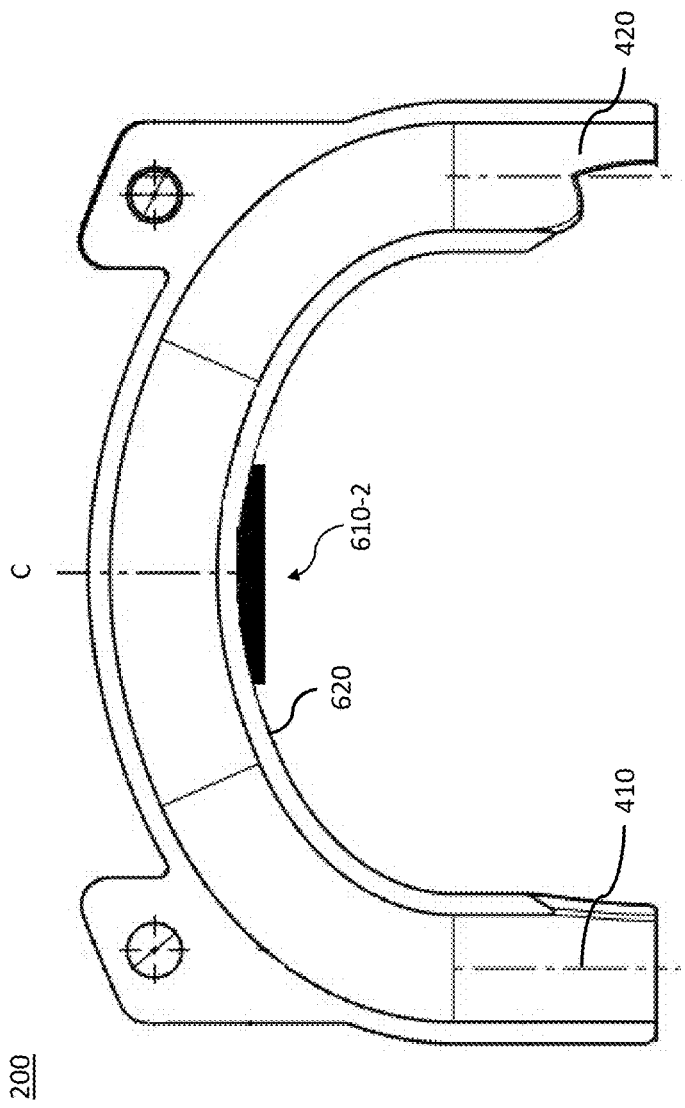
Figure 6E:
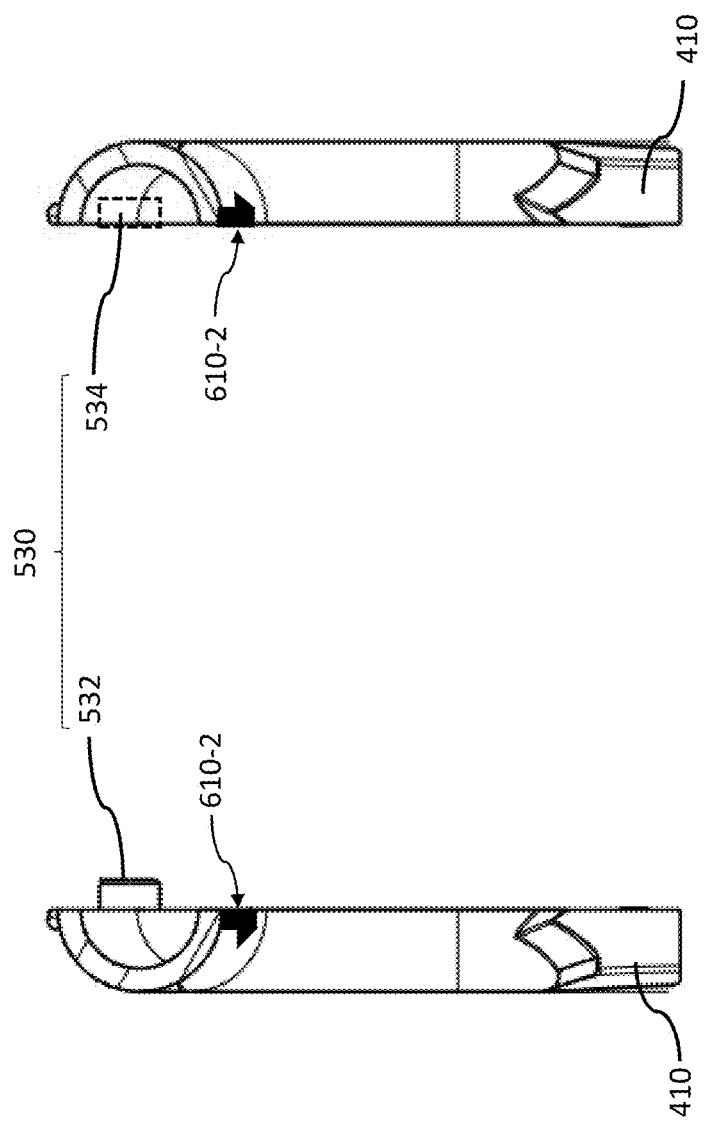
FIG. 6E is an exploded and cross-sectional view taken along a line C of FIG. 6C according to an exemplary embodiment of the present disclosure.

In a second exemplary embodiment of the second projection of the ball return tube 200 shown in FIGS. 6C to 6E, the second projection 610-2 of the ball return tube 200 may have a generally rectangular platelike shape, for example, a tab or T-shaped wide projection or lip. The second projection 610-2 of the ball return tube 200 may be extended along the bottom surface 620 of the ball return tube 200.

The second projection 610-2 may have one or more projecting or locking edges or surfaces 645, such as a lip, on one or both lateral side surfaces of the second projection 610-2. The projecting or locking edges or surfaces 645 of the second projection 610-2 may extend substantially perpendicular to the plane of the second projection 610-2. The projecting edge 645 may have an angled surface 635 to be easily slidable inserted into the recess 630-2 of the ball nut 111. The cross-section of the projecting edge 645 may have a shape of a trapezoid, a triangle, an anchor, a square, a polygon and the like. However, other shapes that are suitable may be implemented.

For instance, the second projection 610-2 includes a relatively straight stem portion 642-2 extending downwardly towards the ball nut 111 and the projecting surface 645 may be formed at the distal end of the second projection 610-2. Alternatively or additionally, the projecting or locking edges or surfaces 645 may be disposed in the middle of the second projection 610-2. The projecting or locking edges or surfaces 645 of the second projection 610-2 may reduce the risk of the ball return tube 200 falling or separating from the ball nut 111.

The ball nut 111 has the recess 630-2 for receiving the second projection 610-2 of the ball return tube 200. The second projection 610-2 of the ball return tube 200 may be snapped into the second recess 630-2 and fit in the recess 630-2 of the ball nut 111. The recess 630-2 of the ball nut 111 may have a shape configured to generally conform to the shape of the second projection 610-2 and mate with the second projection 610-2. The recess 630-2 of the ball nut 111 is sized and dimensioned to receive the second projection 610-2 of the ball return tube 200 so that the second projection 610-2 of the ball return tube 200 can be inserted and securely fixed to the recess 630-2 of the ball nut 111. For example, the shape of the recess 630-2 of the ball nut 111 mirrors the shape of the second projection 610-2 of the ball return tube 200. The recess 630-2 of the ball nut 111 may have a depth substantially identical to a length of the corresponding the second projection 610-2.

Further, the recess 630-2 of the ball nut 111 may include a space 637 for receiving the projecting or locking edge or surface 645 of the second projection 610-2. The space 637 of the recess 630-2 for receiving the projection edge 645 may be larger than the projecting edge 645 of the second projection 610-2 or may have a shape mirroring the projecting edge 645 of the second projection 610-2. The projecting edge 645 of the second projection 610-2 of the ball return tube 200 may fit under a corresponding locking surface or edge 639 of the space 637 of the recess 630-2 of the ball nut 111 to securely engage the projecting edge 645 to the space 637 of the recess 630-2. The projecting or locking edge or surface 645 of the second projection 610-2 locks into place within the space 637 of the recess 630-2 of the ball nut 111. Thus, the second projection 610-2 of the ball return tube 200 may be securely held in the recess 630-2 of the ball nut 111.

While one single second projection 610 is shown, it is contemplated that a plurality of second projections 610 may be provided.

Figure 7A:
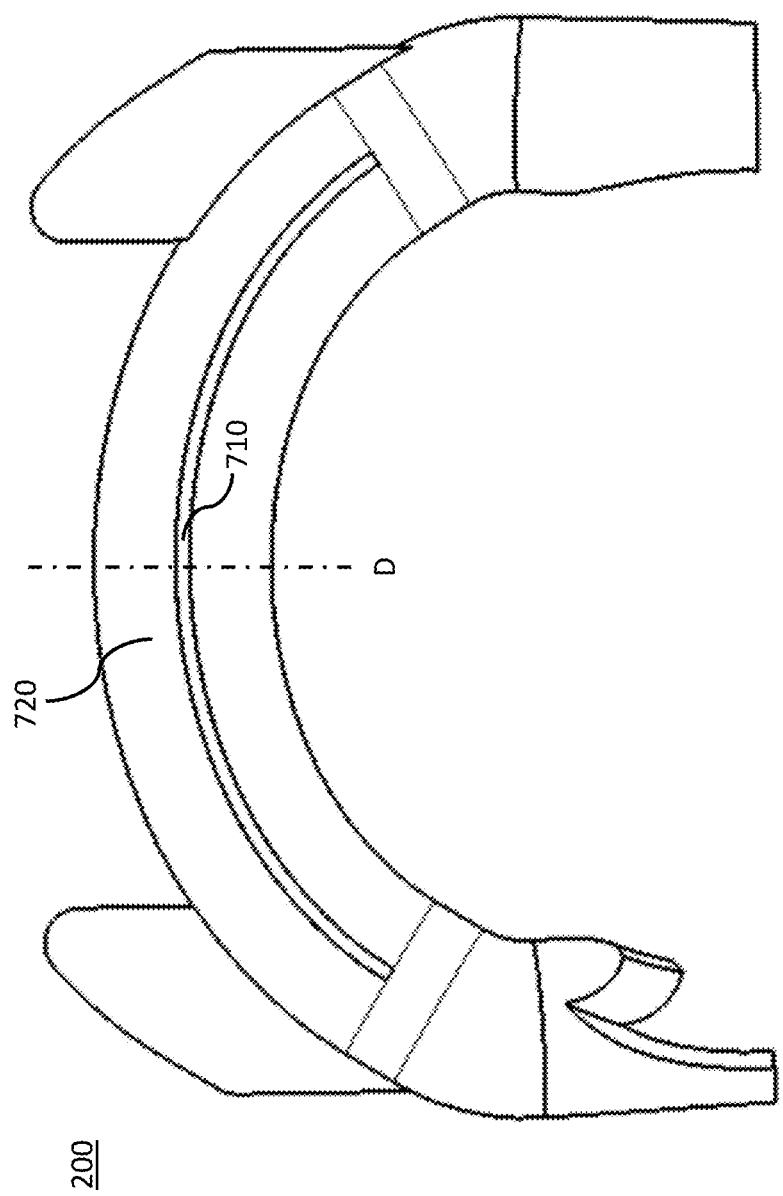
FIG. 7A is a front view of one of tube portions of a ball return tube according to an exemplary embodiment of the present disclosure.
Figure 7C:
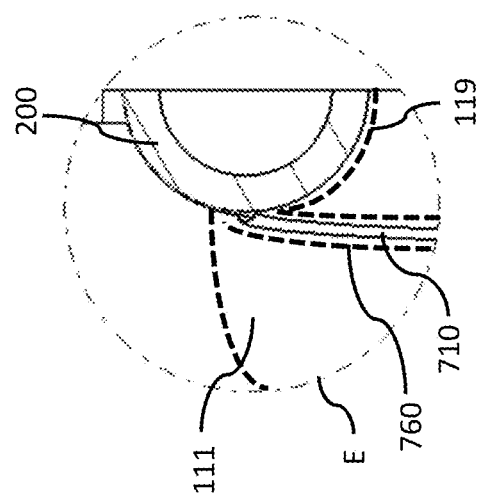
FIG. 7C is an enlarged view of a portion E of FIG. 7B coupled with a ball nut according to an exemplary embodiment of the present disclosure.
Figure 7B:
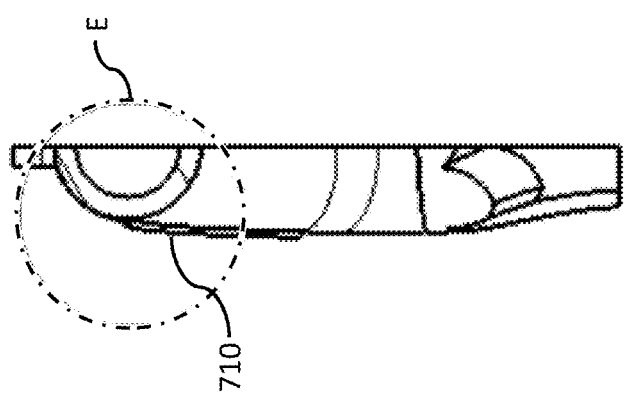
FIG. 7B is a cross-sectional view taken along a line D of FIG. 7A according to an exemplary embodiment of the present disclosure.

Referring now to FIGS. 7A to 7C, the ball return tube 200 may comprise one or more third projections 710 protruding from a third surface 720. The third surface 720 may be, for example, but not limited to, a lateral side surface of the ball return tube 200 positioned between the first and second surfaces 460 and 620 of the ball return tube 200. The third projections 710 may be extended along a portion of the lateral side surface 720 of the ball return tube body 430. The cross-section of the third projection 710 may have a shape of a semi-circle, a trapezoid, a triangle, an anchor, a square, a polygon and the like. However, other shapes that are suitable may be implemented.

The ball return tube path 119 formed on the ball nut 111 has a recess 760 for receiving the lateral projection 710 of the ball return tube 200. The structures of the ball nut 111 are illustrated with dotted lines. The recess 760 may be milled into lateral sides of the ball return tube path 119 of the ball nut 111. The recess 760 of the ball return tube path 119 may have a shape configured to generally conform to the shape of the lateral projection 710 of the ball return tube 200 and mate with the lateral projection 710. The lateral projection 710 of the ball return tube 200 may fit in the recess 760 of the ball return tube path 119 of the ball nut 111. The recess 760 of the ball nut 111 is sized and dimensioned to receive the lateral projection 760 of the ball return tube 200 so that the lateral projection 760 of the ball return tube 200 can be inserted and securely fixed to the recess 760 of the ball return tube path 119. For example, the shape of the recess 760 of the ball nut 111 mirrors the shape of the lateral projection 710 of the ball return tube 200. However, the recess 760 may have any shape desired, dependent at least partially upon the shape and position of the third projection 710. The number of the third recesses 760 of the ball nut 111 may correspond to the number of the lateral projections 710 of the ball return tube 200.

When the ball return tube 200 has the lateral projection 710 and the ball nut 111 has the corresponding recess 760 in the lateral side of the ball return tube path 119, the ball return tube path 119 may need a deeper depth than other exemplary embodiments that do not include the lateral projection 710 (e.g. the exemplary embodiments illustrated in FIGS. 4 to 6 and 8). The lateral projection 710 of the ball return tube 200 may provide additional stability of the ball return tube 200 on the ball return tube path 119 of the ball nut 111.

While two lateral projections 710 are shown, it is contemplated that a single lateral projection 710 may be provided or more than two may be provided.

Figure 8B:
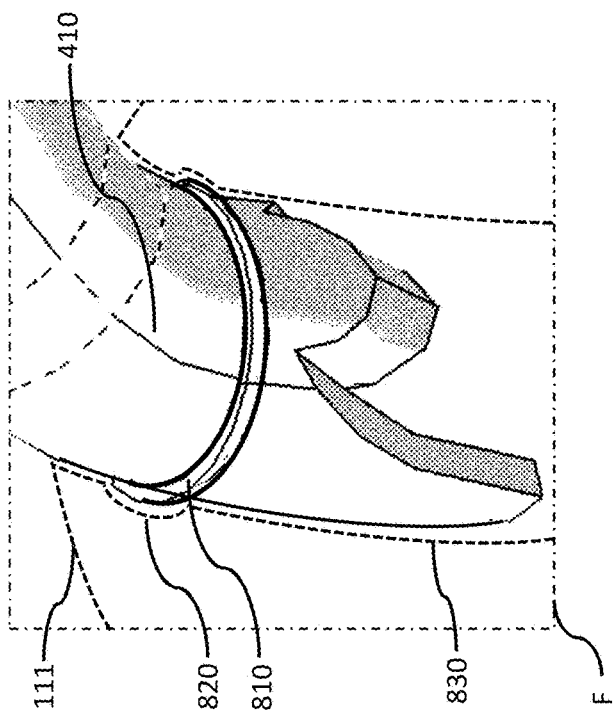
FIG. 8B is an enlarged view of a portion F of FIG. 8A coupled with a ball nut according to an exemplary embodiment of the present disclosure.
Figure 8A:
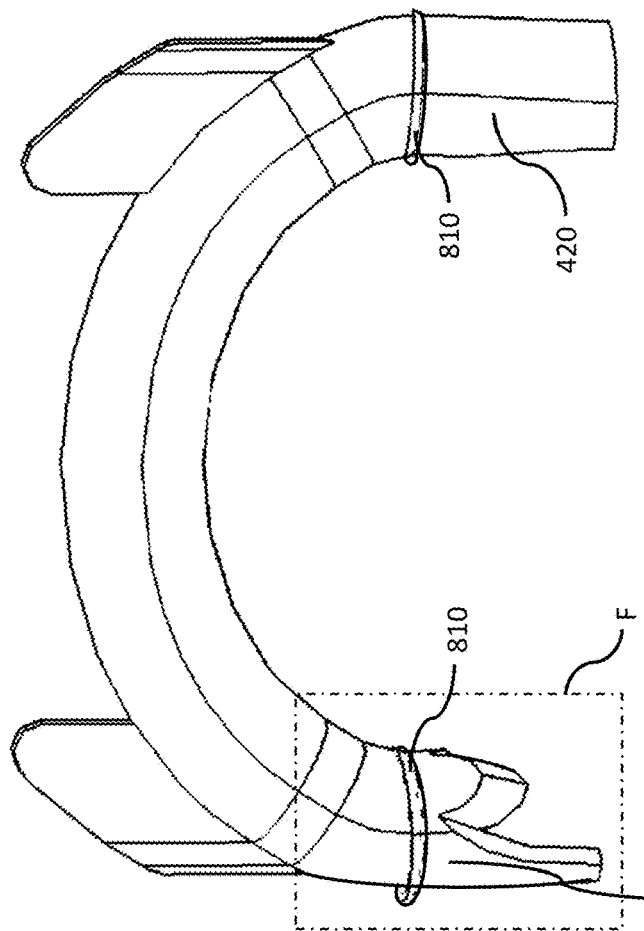
FIG. 8A is a front view of a ball return tube according to an exemplary embodiment of the present disclosure.

Referring now to FIGS. 8A and 8B, the ball return tube 200 may comprise one or more fourth projections 810 protruding radially outward from a circumferential surface of the ball return tube 200. For example, the fourth projection 810 may be a radially enlarged flange projecting from the circumferential surface of the ball return tube 200. The fourth projections 810 may be formed on the first and second open end portions 410, 420. Alternatively, the fourth projections 810 may positioned adjacent to the first and second open end portions 410, 420 on a surface of the ball return tube 200 contacting the ball nut 111. The cross-section of the fourth projection 810 may have a shape of a semi-circle, a trapezoid, a triangle, an anchor, a square, a polygon and the like. However, other shapes that are suitable may be implemented.

The ball nut 111 has a recess 820 for receiving the fourth projection 810 of the ball return tube 200. The structures of the ball nut 111 is illustrated with dotted lines. The recess 820 may be formed on an inner surface of a tube hole 830 of the ball nut 111. The recess 820 may be positioned adjacent to the first and second openings 116 and 117 of the ball nut 111. The recess 820 may be milled into the side of the tube hole 830 of the ball nut 111. The recess 820 of the tube hole 830 of the ball nut 111 may have a shape configured to generally conform to the shape of the fourth projection 810 of the ball return tube 200 and mate with the fourth projection 810. The fourth projection 810 of the ball return tube 200 may snap into and fit in the recess 820 of the tube hole 830 of the ball nut 111. The recess 820 is sized and dimensioned to receive the fourth projection 810 of the ball return tube 200 so that the fourth projection 810 of the ball return tube 200 can be inserted and securely fixed to the recess 820 of the tube hole 830 of the ball nut 111. For example, the shape of the recess 820 of the tube hole 830 of the ball nut 111 mirrors the shape of the fourth projection 810 of the ball return tube 200. However, the fourth recess 820 may have any shape desired, dependent at least partially upon the shape and position of the fourth projection 810. The number of the recesses 820 of the ball nut 111 may correspond to the number of the fourth projections 810 of the ball return tube 200. The fourth protrusion 810 of the ball return tube 200 and the recess 820 of the tube hole 830 of the ball nut 111 may reduce the risk of the ball return tube 200 disengaging from the ball nut 111. While two fourth protrusions 810 are shown, it is contemplated that a single fourth protrusion 810 may be provided or more than two may be provided.

The ball return tube 200 may comprise one or combination of the first projection 440, the second projection 610, and the third projection 710 and the fourth protrusion 810.

The first projection 440, the second projection 610, and the third projection 710 and the fourth protrusion 810 may provide additional support and stability for the ball return tube 200 to remain on the ball return tube path 119 of the ball nut 111. The structures of the first projection 440, the second projection 610, and the third projection 710 and the fourth protrusion 810 may help to prevent accidental release of the ball return tube 200 from the ball nut 111.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A ball return tube for connecting openings of a ball nut to circulate balls, the ball return tube comprising:
   tube end portions for being coupled to the openings of the ball nut; and
   a ball return tube body connecting the tube end portions so that the balls pass through the ball return tube body including a first surface formed on one side of the ball return tube body and a second surface formed on another side of the ball return tube body,
   wherein:
   the ball return tube is constructed in first and second tube portions fixedly joined together by structures included in one or more first projections protruding from the first surface of the ball return tube body, and
   the ball return tube further comprises one or more second projections protruding directly from the second surface formed on the another side of the ball return tube body facing the ball nut in a direction toward the ball nut so that the one or more second projections of the ball return tube body are coupled to one or more corresponding recesses of the ball nut.

2. The ball return tube of claim 1, wherein the structures included in the one or more first projections protruding from the first surface of the ball return tube body comprise snap fits configured to engage one another to fixedly couple the first and second tube portions together.

3. The ball return tube of claim 2, wherein:
one of the one or more first projections of the first tube portion comprises a male snap, and another of the one or more first projections of the first tube portion comprises a female snap; and
one of the one or more first projections of the second tube portion comprises a female snap corresponding to the male snap of the one of the one or more first projections of the first tube portion, and another of the one or more first projections of the second tube portion comprises a male snap corresponding to the female snap of the another of the one or more first projections of the first tube portion.

4. The ball return tube of claim 2, wherein:
the one or more first projections of the first tube portion comprise a male snap extending from a surface of the one or more first projections of the first tube portion, and
the one or more first projections of the second tube portion comprise a female snap receiving the male snap of the first tube portion.

5. The ball return tube of claim 1, wherein a distal end of the one or more first projections protruding from the first surface of the ball return tube body is spaced apart from an inner surface of a housing accommodating the ball nut.

6. The ball return tube of claim 1, wherein one or more of the first projections extend from the first surface of the ball return tube body in a direction away from the ball nut.

7. The ball return tube of claim 1, wherein one or more of the first projections extend from the first surface of the ball return tube body in a direction away from one or both of the tube end portions.

8. The ball return tube of claim 1, wherein the second surface of the ball return tube body from which the one or more second projections protrude faces the ball nut.

9. The ball return tube of claim 1, wherein the one or more second projections protruding from the second surface of the ball return tube body in the direction toward the ball nut include an enlarged portion having a greater width or diameter than a remainder of the one or more second projections.

10. The ball return tube of claim 1, wherein a head portion of the one or more second projections protruding from the second surface of the ball return tube body in the direction toward the ball nut have a greater width or diameter than a stem portion of the one or more second projections protruding from the another surface of the ball return tube body in the direction toward the ball nut.

11. The ball return tube of claim 1, wherein the one or more second projections protruding from the second surface of the ball return tube body in the direction toward the ball nut has a pin shape to be coupled to one or more corresponding recesses of the ball nut.

12. The ball return tube of claim 1, wherein the one or more second projections protruding from the second surface of the ball return tube body in the direction toward the ball nut comprises a tab shape to be coupled to one or more corresponding recesses of the ball nut.

13. The ball return tube of claim 12, wherein the one or more second projections protruding from the second surface of the ball return tube body in the direction toward the ball nut have a projecting edge protruding in a direction substantially perpendicular to the direction toward the ball nut.

14. The ball return tube of claim 1, wherein the ball return tube comprises one or more third projections protruding from a lateral side surface of the ball return tube body to be coupled to one or more corresponding recesses formed in the ball nut, wherein the lateral side surface of the tube body, from which the one or more third projections protrude, contacts the ball nut.

15. The ball return tube of claim 14, wherein the one or more third projections protruding from the lateral side surface of the ball return tube body protrude substantially perpendicular to a direction toward the ball nut.

16. The ball return tube of claim 1, further comprising one or more fourth projections protruding from at least one of surfaces of the tube open end portions to be coupled to one or more corresponding recesses formed on an inner surface of the openings of the ball nut.

17. The ball return tube of claim 16, wherein the one or more fourth projections protruding from the at least one of surfaces of the tube open end portions have a ring shape.

18. The ball return tube of claim 1, wherein a direction of the one or more second projections' protruding directly from the second surface of the ball return tube body for being coupled to the one or more corresponding recesses of the ball nut is different from a direction of the one or more first projections' protruding from the first surface of the ball return tube body for joining the first and second tube portions together.

19. The ball return tube of claim 1, wherein a direction of the one or more second projections' protruding directly from the second surface of the ball return tube body for being coupled to the one or more corresponding recesses of the ball nut is perpendicular to a direction of the one or more first projections' protruding from the first surface of the ball return tube body for joining the first and second tube portions together.

* * * * *